US012720352B2

(12) United States Patent
Li et al.

(10) Patent No.: US 12,720,352 B2
(45) Date of Patent: Aug. 25, 2026

(54) METHOD FOR MEASUREMENT RELAXATION AND COMMUNICATION DEVICE

(71) Applicant: BEIJING XIAOMI MOBILE SOFTWARE CO., LTD., Beijing (CN)

(72) Inventors: Yanhua Li, Beijing (CN); Xiaofei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 331 days.

(21) Appl. No.: 18/286,757

(22) PCT Filed: Apr. 13, 2021

(86) PCT No.: PCT/CN2021/086994

§ 371 (c)(1),
(2) Date: Oct. 12, 2023

(87) PCT Pub. No.: WO2022/217460

PCT Pub. Date: Oct. 20, 2022

(65) Prior Publication Data

US 2024/0205714 A1 Jun. 20, 2024

(51) Int. Cl.

*H04W 4/00* (2018.01)
*H04W 24/10* (2009.01)
*H04W 64/00* (2009.01)
*H04W 76/20* (2018.01)
*H04W 76/30* (2018.01)

(52) U.S. Cl.

CPC ........... *H04W 24/10* (2013.01); *H04W 64/00* (2013.01); *H04W 76/20* (2018.02); *H04W 76/30* (2018.02)

(58) Field of Classification Search

CPC ..................................................... H04W 24/10
See application file for complete search history.

(56) References Cited

U.S. PATENT DOCUMENTS 10,979,965 B2 4/2021 Rosa et al.
2018/0048413 A1 2/2018 Liu et al.
2018/0359683 A1 12/2018 Rosa et al.
2020/0314868 A1* 10/2020 Tseng ...................... H04W 8/08
2021/0076275 A1 3/2021 Yiu et al.
2021/0105643 A1 4/2021 Kim et al.
2021/0105719 A1* 4/2021 Thangarasa ........... H04W 76/27
(Continued)

FOREIGN PATENT DOCUMENTS

CN 111107613 A 5/2020
CN 111263372 A 6/2020
(Continued)

OTHER PUBLICATIONS

ISA, English Translation of the Written Opinion of the International Searching Authority PCT/CN2021/086994, WIPO, Dec. 22, 2021, pp. 1-5. (Year: 2021).*
(Continued)

*Primary Examiner* — Elisabeth Benoit Magloire
(74) *Attorney, Agent, or Firm* — Arch & Lake LLP; Hao Tan; Shen Wang

(57) ABSTRACT

A method for measurement relaxation and communication device are provided in the present disclosure, the method is performed by a terminal device and includes not performing measurement relaxation in a non-connected state.

19 Claims, 3 Drawing Sheets

(56) References Cited

U.S. PATENT DOCUMENTS

| | | | | |
|---|---|---|---|---|
| 2022/0232440 | A1* | 7/2022 | Dalsgaard | H04W 36/0058 |
| 2022/0303905 | A1* | 9/2022 | Cui | H04W 48/16 |
| 2024/0073841 | A1* | 2/2024 | Barbu | H04W 56/0045 |
| 2024/0114585 | A1* | 4/2024 | Koskinen | H04W 76/30 |

FOREIGN PATENT DOCUMENTS

| | | | |
|---|---|---|---|
| CN | 111294853 | A | 6/2020 |
| CN | 111527774 | A | 8/2020 |
| CN | 111615119 | A | 9/2020 |
| CN | 111641962 | A | 9/2020 |
| CN | 111787567 | A | 10/2020 |
| CN | 111800800 | A | 10/2020 |
| CN | 111919468 | A | 11/2020 |
| WO | 2020200084 | A1 | 10/2020 |

OTHER PUBLICATIONS

Laselva et al., UE Measurements Relaxation for UE Power Saving in 5G New Radio, IEEE Xplore, 2021, pp. 1-6. (Year: 2021).*

International Search Report issued in Application No. PCT/CN2021/086994, dated Dec. 23, 2021, with English translation,(5p).

VIVO, CATT, "Summary of RRM relaxation behaviors", 3GPP TSG-RAN WG2 Meeting #112-e R2-2009080 Electronic, Nov. 2-Nov. 13, 2020 (resubmission of R2-2008569), (4p).

3GPP TS 38.133 V18.3.0 (Sep. 2023); Technical Specification Group Radio Access Network; NR; Requirements for support of radio resource management (Release 18), (5455p).

The First Office Action issued in Application No. 202180001206.4 dated Feb. 14, 2025, (20p).

Qualcomm Incorporated, "RRM measurement relaxation for stationary UEs" 3GPP TSG-RAN WG2 Meeting #113bis-e Online, Apr. 12-16, 2021, R2-2102682, (6p).

Nokia, Nokia Shanghai Bell, "UE RRM Core requirements when applying UE power saving", 3GPP TSG-RAN WG4 Meeting#94-e, e-Meeting, Feb. 24-Mar. 6, 2020, R4-2001343, (6p).

Huawei, HiSilicon, "RRM measurement relaxation for RedCap UE", 3GPP TSG-RAN WG2 Meeting #113bis-e Electronic, Apr. 12-20, 2021, R2-2104060, (6p).

The Second Office Action issued in Application No. 202180001206.4 dated Feb. 14, 2025, (21p).

Chinese Patent Notice of Allowance issued in Application No. 202180001206.4 dated Sep. 8, 2024, (5p).

* cited by examiner the terminal device does not perform measurement relaxation in a non-connected state
310
FIG. 3
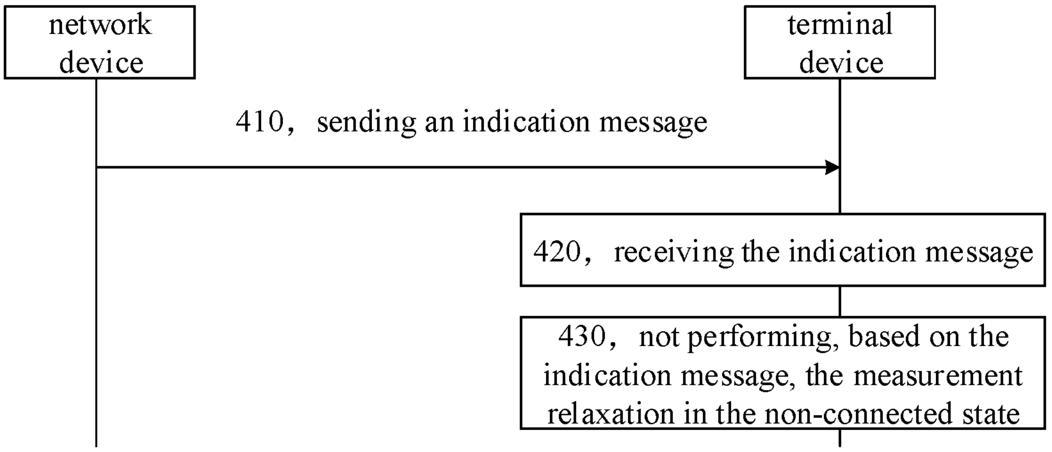
FIG. 4
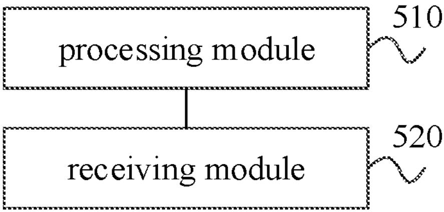
FIG. 5
transceiver module
610
FIG. 6

METHOD FOR MEASUREMENT RELAXATION AND COMMUNICATION DEVICE

CROSS-REFERENCE

The present application is a U.S. National Stage of International Application No. PCT/CN2021/086994, filed on Apr. 13, 2021, the entire content of which is incorporated herein by reference for all purposes.

BACKGROUND

In a communication system, a terminal device may perform Radio Resource Management (RRM) measurement to switch, select, or reselect a cell.

Measurement relaxation is introduced for the RRM measurement, and the measurement relaxation refers to a RRM measurement manner that reduces measurement power consumption by reducing a number of RRM measurements.

SUMMARY

The present disclosure relates to a field of communication technology, and more particularly to a method and an apparatus for measurement relaxation, and storage medium.

According to a first aspect of the present disclosure, a method for measurement relaxation is provided, the method is performed by a terminal device and includes:

not performing measurement relaxation in a non-connected state.

According to a second aspect of the present disclosure, a method for measurement relaxation is provided, the method is performed by a network device and includes:

sending an indication message to a terminal device, where the indication message is used to indicate that the terminal device does not perform measurement relaxation in a non-connected state.

According to a third aspect of the present disclosure, a communication device is provided and includes: a processor; a transceiver connected to the processor; and a memory for storing executable instructions of the processor; where the processor is configured to load and execute the executable instructions to implement the method for measurement relaxation performed by the terminal device according to the above aspect.

According to a fourth aspect of the present disclosure, a communication device is provided and includes: a processor; a transceiver connected to the processor; and a memory for storing executable instructions of the processor; where the processor is configured to load and execute the executable instructions to implement the method for measurement relaxation performed by the network device according to the above aspect.

BRIEF DESCRIPTION OF THE DRAWINGS

To illustrate a technical solution in the embodiments of the present disclosure more clearly, accompanying drawings used for describing the embodiments are briefly introduced below. Obviously, the accompanying drawings in the following descriptions are merely some embodiments of the present disclosure, and those skilled in the art may obtain other drawings according to the accompanying drawings without paying creative efforts.

FIG. 3 is a flowchart of a method for measurement relaxation provided in an embodiment of the present disclosure;

FIG. 4 is a flowchart of a method for measurement relaxation provided in an embodiment of the present disclosure;

FIG. 5 is a block diagram of an apparatus for measurement relaxation provided in an embodiment of the present disclosure;

FIG. 6 is a block diagram of an apparatus for measurement relaxation provided in an embodiment of the present disclosure;

DETAILED DESCRIPTION

In order to make the purpose, technical solution, and advantages of the present disclosure clearer, embodiments of the disclosure will be further described in detail with reference to the accompanying drawings.

Figure 1:
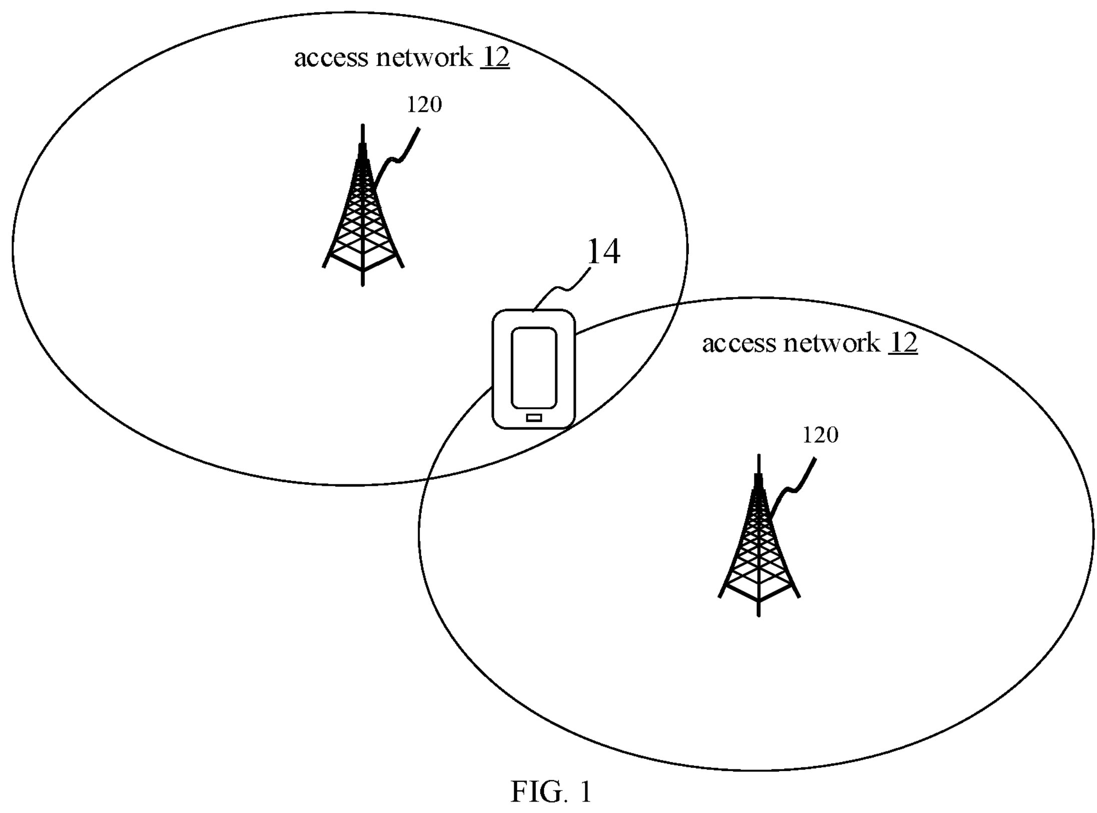
FIG. 1 is a block diagram of a communication system provided in an embodiment of the present disclosure.

FIG. 1 shows a block diagram of a communication system provided in an embodiment of the present disclosure, and the communication system may include an access network 12 and a terminal device 14.

The access network 12 includes several network devices 120. The network device 120 may be a base station, which is a device deployed in the access network to provide wireless communication functions for terminal devices. The base stations may include various forms of macro base stations, micro base stations, relay stations, access points, and so on. In systems using different wireless access technologies, names of devices having base-station functions may vary. For example, it may be called as an eNodeB or an eNB in a long term evolution (LTE) system, and it is called a gNodeB or a gNB in a 5G new radio (NR) system. As the communication technology evolves, the description of "base station" may change. To facilitate the description in the embodiments of the present disclosure, the devices that provide wireless communication functions for the terminal device 14 are collectively referred to as network devices. In the embodiments of the present disclosure, the network device may be a positioning server.

The terminal device 14 may include various handheld devices, vehicle-mounted devices, wearable devices, computing devices with wireless communication functions, or Internet of Things (IoT) devices, or industrial internet of things (IIoT) devices, or other processing devices connected to wireless modems, as well as various forms of user devices, mobile stations (MS), terminal devices, etc. For convenience of description, the devices mentioned above are collectively referred to as terminal devices. The network device 120 and the terminal device 14 communicate with each other through some kind of air interface technology, such as a Uu interface.

The technical solution of the embodiments of the present disclosure can be used in various communication systems, such as, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an NR system evolution system, an LTE-based access to unlicensed spectrum (LTE-U) system, an NR-U system, a universal mobile telecommunication system (UMTS), a worldwide interoperability for microwave access (WiMAX) communication system, a wireless local area networks (WLAN), Wireless Fidelity (WiFi), a next-generation communication system, or other communication systems.

Generally speaking, traditional communication systems support a limited number of connections and are easy to implement. However, with the development of communication technology, mobile communication systems not only support traditional communication, but also support, for example, device to device (D2D) communication, machine to machine (M2M) communication, machine type communication (MTC), Vehicle to Vehicle (V2V) communication and Vehicle to Everything (V2X) system. The embodiments of the present disclosure can also be used in these communication systems.

In the related art, the measurement relaxation is achieved based on a time-domain measurement relaxation criterion. Generally, the RRM measurement is performed at a fixed measurement interval, while based on the time-domain measurement relaxation criterion, when the terminal device meets a certain condition, the measurement is not performed during a certain time period, or a measurement interval is increased.

Before the introduction of the technical solution of the present disclosure, first, some background technical knowledge involved in the present disclosure is introduced and illustrated.

In a communication system, a terminal device needs to periodically measure a downlink signal to keep trace of a network cell. The RRM measurement is a measurement manner defined in communication standards for measuring the downlink signal.

Based on the definition in TS 38.133, the conventional RRM measurement refers to a terminal device performs the measurement at a fixed measurement interval. In order to reduce measurement power consumption caused by the conventional RRM measurement, measurement relaxation is introduced. The measurement relaxation refers to a RRM measurement manner that reduces the measurement power consumption by reducing the number of RRM measurements. In the related art, the measurement relaxation generally refers to measurement relaxation in a time domain, such as not performing the measurement during a certain time period, or increasing a measurement interval to reduce the number of measurements, so as to reduce the measurement power consumption.

1) Measurement Relaxation Solution of R15

A measurement rule for cell reselection defined in TS38.304 is as follows:

For intra-frequency measurement:

- if a serving cell meets $S_{rxlev}>S_{IntraSearchP}$ and $S_{qual}>S_{IntrasearchQ}$, the terminal device may choose not to perform the intra-frequency measurement;
- if a serving cell meets $S_{lev}\leq S_{IntraSearchP}$ or $S_{qual}\leq SI_{ntraSearchQ}$, the terminal device should perform the intra-frequency measurement.

For inter-frequency or inter-RAT measurement:

- if a serving cell meets $S_{rxLev}>S_{nonIntraSearchP}$ and $S_{qual}>S_{nonIntrasearchQ}$, the terminal device may choose not to perform the measurement of NR inter-frequencies or inter-RAT frequency cells with equal or lower priority; the terminal device should perform measurement of higher priority NR inter-frequency or inter-RAT frequencies for at least K*60 s, where K is the number of inter-frequency and inter-RAT frequency layers;
- if the serving cell meets $S_{lev}\leq S_{nonIntraSearenP}$ and $S_{qual}\leq S_{nonIntrasearchQ}$, the terminal device should search for and measure inter-frequency layers with higher, equal or lower priority in preparation for possible reselection.

The basic idea of above is that when the terminal device performs the intra-frequency measurement/the inter-frequency measurement (equal priority or lower priority) of neighboring cell, if a reference signal receiving power (RSRP)/a reference signal receiving quality (RSRQ) of the serving cell is higher than a threshold ($S_{IntraSearchP}$, $S_{IntraSearchQ}$), the intra-frequency measurement may not be performed, or the inter-frequency measurement/the intra-frequency measurement with equal or lower priority may not be performed. For the high-priority inter-frequency measurement of the neighboring cell, if the RSRP/RSRQ of the serving cell is higher than the threshold ($S_{IntraSearchP}$ $S_{IntrasearchQ}$), the measurement relaxation to 60 s is performed.

2) Measurement Relaxation Solution of R16

A measurement relaxation solution includes two parts: a first part is a determination of a measurement relaxation standard, i.e., a standard the terminal needs to meet in order to perform the measurement relaxation, the rule is usually configured to a certain measurement threshold for the terminal through a network, and the terminal determines whether the relaxation can be performed according to the rule and the threshold; a second part is a measurement relaxation criterion, i.e., after different relaxation conditions are met, a specific approach of how to perform what kind of relaxation is determined according to the measurement relaxation criterion provided by RAN4.

2.1 Relaxation Rule

Currently, there are two relaxation rules, one relaxation rule for low mobility, and the other relaxation for not being at a cell edge.

2.11 Low Mobility

During a certain time ($T_{searchDeltaP}$), if a difference between a reference receiving signal quality and a current RSRP of the terminal device is less than a certain preset threshold value ($S_{SearchDeltaP}$), that means that signal change amplitude is not large, thus it may be considered to be currently in a stationary or in a low mobility state. It should be noted that, the determination only needs to be considered when the signal drops, and the specific determination condition is as follows:

$$(S_{rxlevRef}-S_{rxlev})<S_{SearchDeltaP}$$

where $S_{rxlev}=S_{rxlev}$ of a current serving cell, in dB; $S_{rxlevRef}$=a reference value of $S_{rxlev}$ of a current serving cell, in dB.

$S_{rxlevRef}$ is set as follows:

(1) UE selects or reselects a new cell.

$$(S_{rxlev}-S_{rxlevRef}>0). \tag{2}$$

(3) the determination condition is not met within $T_{searchDeltaP}$.

When any one of the above conditions are met, the terminal device sets $S_{rxlevRef}$ as $S_{rxlev}$ of the current serving cell.

Regarding the setting of $T_{searchDeltaP}$, LTE system sets $T_{searchDeltaP}$ to 5 mins; and NR sets the value to be configurable, and the current discussion is that $T_{searchDeltaP}$ should be set to less than or equal to 5 mins and meet a relationship of being a multiple of a measurement period. If eDRX is configured, if an eDRX period is greater than 5 mins, $T_{searchDseltP}$ is set to the eDRX period.

In the LTE, even if the relaxation condition is met, the terminal device needs to perform the measurement every 24 hours. In the NR, R16 is defined as either the measurement relaxation or to stop the measurement (see the section on a measurement relaxation criterion below).

2.12 Cell Edge

If a current $S_{rxlev}$ of the terminal device is greater than a threshold value $S_{searchThresholdP}$ and $S_{qual}$ is greater than a threshold value $S_{searchThresholdQ}$ (if configured), it is considered that the terminal device is not at the cell edge, and the specific determination condition is as follows:

$$S_{rxlev} > S_{searchThresholdP}, \text{ and } S_{qual} > S_{searchThresholdQ} (\text{if configured})$$

where $S_{rxlev}=S_{rxlev}$ of a current serving cell, in dB; $S_{qual}=S_{qual}$ of a current serving cell, in dB.

Figure 2:
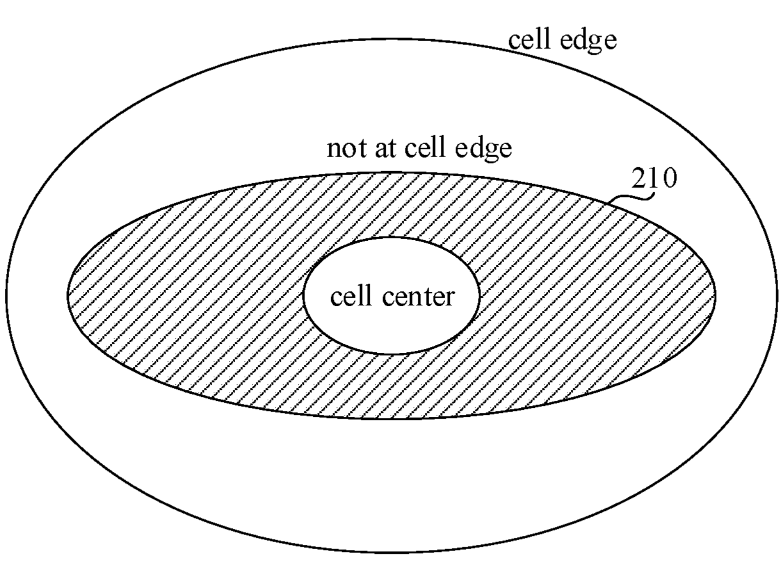
FIG. 2 is a schematic diagram of a cell edge determination provided in an embodiment of the present disclosure.

These two thresholds are more relaxed thresholds than the stopping the measurement in R15, as shown in FIG. 2. The area that is not at the cell edge defined in R16 corresponds to a middle part area 210 in FIG. 1.

2.2 Measurement Relaxation Manner

In R16, the measurement relaxation is generally implemented based on a time-domain measurement relaxation manner, such as manner 1: a measurement period defined in R15 is relaxed to a measurement period with a wider time measurement interval.

manner 2: the measurement is stopped after 1 hour.

manner 3: during high-priority inter-frequency measurement, if the RSRP/RSRQ of the serving cell is greater than the threshold, the measurement relaxation to 60 s is performed.

The measurement relaxation is not performed, i.e., the conventional RRM measurement is performed according to the definition in TS 38.133.

A final result of the measurement relaxation in R16 is as follows:

On the basis of the original R15, for an additional extra relaxation condition that is met, for example, for a non-cell-center user with equal or lower priority, if it is met that the non-cell-center user is not at the cell edge or has low mobility, the relaxation measurement is further performed, i.e., criterion 1 is adopted, to relax the measurement period defined in R15 to a measurement period with a wider time measurement interval.

The embodiments of the present disclosure do not exclude the introduction of a new manner of the measurement relaxation in R17.

3) Redcap User

In the current 3GPP standardization, a new terminal type called Reduced Capability UE, or NR-lite or Redcap terminal for short has been proposed. This type of device is similar to IoT device in the LTE, and usually needs to meet the following requirements: low cost, low complexity; coverage enhancement to a certain extent, and power saving.

After the introduction of the Redcap user, unlike a typical Enhanced Mobile Broadband (eMBB) user, the Redcap user is in stationary in some scenarios, resulting in lower mobility compared to the eMBB user. At present, a common approach is to introduce a new determination threshold for the Redcap user, which determines that characteristic of the Redcap user is in stationary according to a stricter mobility standard.

A measurement relaxation mechanism of R16 needs to consider a certain enhancement to adapt to the Redcap user. The currently widely discussed approach is to introduce stricter determination for previously low mobility, most likely by setting a smaller $S_{SearchDeltaP}$ for $(S_{rxlevRef}-S_{rxlev})<S_{SearchDeltaP}$, and using the aforementioned smaller $S_{SearchDeltaP}$ to determine whether the Redcap user is in stationary.

Current possible time-domain relaxation manners may include:

a time-domain relaxation manner 1: i.e., no measurement for a longer time period (1 hour) on the basis of originally stopping the measurement.

As an implementation: the measurement is stopped for X hours, X>=1.

a time-domain relaxation manner 2: i.e., a measurement interval is increased on the basis of the original measurement.

As an implementation, the relaxation measurement is performed using a longer measurement interval (scaling factor'), where the scaling factor' is a scaling factor that is larger than an original scaling factor. The scaling factor used in an existing protocol is K1, and a scaling factor greater than K1 is introduced.

4) Network Slice

A network slice may provide a complete end-to-end virtual network for a specific user. By dividing network resources into a plurality of network slices, 5G network slices may provide differentiated services for user with different service requirements (such as latency, reliability, capacity, isolation, and other functions). Operator networks not only serve information consumption services characterized by "Best Effort transmission" as the communication demand feature, but also meet production control services characterized by "deterministic transmission" as the communication demand feature, to allocate logically or physically isolated network resources for services with disparate communication requirements.

A network slice includes a Radio Access Network (RAN) section and a Core Network (CN) section. The implementation of the network slice relies on a principle that the traffic of different slices is processed by different Protocol Data Units (PDUs) sessions. The network may implement different network slice by scheduling and providing different L1/L2 configurations.

Each network slice is uniquely identified by a single Network Slice Selection Assistance Information (S-NSSAI), and the S-NSSAI consists of Slice/Service Type (SST) and Slice Differentiator (SD). The NSSAI is a collection of S-NSSAIs, including one or a plurality of S-NSSAIs.

The Redcap user generally have a positioning requirement. As stated above, if the terminal device is the Redcap user, when using Enhanced Cell ID (E-CID) positioning technology based on the cell identification, it is necessary to measure the RSRP of a current cell and a neighboring cell. However, the Redcap user is currently considering relaxing the measurement of the neighboring cell. For example, for the Redcap user who is at the cell edge and in stationary, there is no need to perform the measurement on the neighboring cell in an idle state. The Redcap user has no measurement result of the neighboring cell and thus the Redcap user cannot be effectively positioned based on the measurement result.

In a case of relaxation measurement, the measurement interval may also be extended. When the measurement interval is relatively large, a position of the terminal device may changes significantly within the measurement interval. If the terminal device has a positioning requirement, the positioning requirement to be performed based on the measurement result corresponding to a relatively large measurement interval, which may lead to an inaccurate positioning result.

If the terminal device adopts the network slice, when the network slice changes, a priority of a frequency point of the terminal device changes. Thus, the manner for measurement relaxation is inaccurate based on the priority of the frequency point corresponding to a previous network slice.

In the embodiment of the present disclosure, the terminal device does not perform the measurement relaxation in a non-connected state, thereby avoiding the aforementioned problem. As illustrated below, an exemplary explanation will be provided in conjunction with the following embodiments.

FIG. 3 shows a flowchart of a method for measurement relaxation provided in an embodiment of the present disclosure, which may be applied to a communication system as shown in FIG. 1. The method may include step 301:

In step 310, the terminal device does not perform measurement relaxation in a non-connected state.

The non-connected state refers to a radio resource control (RRC) state of the terminal device. The non-connected state includes at least one of the following states: an idle state (IDLE) and an inactive state (INACTIVE).

In the embodiment of the present disclosure, the terminal device does not perform the measurement relaxation in the non-connected state. For example, the terminal device does not perform the measurement relaxation in the idle state; the terminal device does not perform the measurement relaxation in the inactive state. In the embodiment of the present disclosure, the terminal device may be all types of terminal devices or some types of terminal devices. For example, the terminal device is a terminal device with a certain requirement; a terminal device using a certain service; or a terminal device belonging to a certain user type, and the like.

The measurement relaxation refers to a RRM measurement manner that reduces the number of measurements compared to the conventional RRM measurement defined in TS 38.133. The measurement relaxation is convenient for saving power consumption of the terminal device.

The terminal device performs the measurement relaxation based on a certain measurement relaxation criterion. In an embodiment, the terminal device does not perform the measurement relaxation in the non-connected state, it may perform routine RRM measurement without performing all measurement relaxation criteria; or it may also not perform some measurement relaxation criteria.

To sum up, in the method provided in the present embodiment, the terminal device may not perform the measurement relaxation in the non-connected state, so as to avoid the problem that the specific requirement cannot be guaranteed caused by the performance of the measurement relaxation in the current scenario.

In an embodiment, the terminal device may have the following possible implementation:

The terminal device is a terminal device with a positioning requirement.

If the terminal device is the terminal device with the positioning requirement, the terminal device needs as many measurement results as possible in each cell to ensure that the positioning result obtained based on the measurement result satisfies the positioning requirement. The measurement relaxation is not performed on the terminal device with the positioning requirement, which may ensure that the positioning requirement is met.

The terminal device is a terminal device using a network slice service.

The network slice is related to a frequency point of the terminal device, and the terminal device needs to perform the measurement relaxation based on a priority of the frequency point.

If the terminal device is a terminal device using a network slice service, when the network slice changes, the priority of the frequency point of the terminal device changes accordingly. Thus, the measurement relaxation performed according to a priority of a frequency point corresponding to a previous network slice results in the manner for measurement relaxation performed by the terminal device not being a correct manner for measurement relaxation. The measurement relaxation is not performed on the terminal device using the network slice service, which may avoid the problem that the current manner for measurement relaxation performed by the terminal device is not the correct manner for measurement relaxation.

The terminal device is a terminal device belonging to a reduced capacity terminal type.

The terminal device with the reduced capacity terminal type is the Redcap user mentioned above. For example, the terminal device with the reduced capacity terminal type includes an industrial sensor, a positioning sensor, and a video surveillance device.

Since the terminal device with the reduced capacity terminal type is considering performing the measurement relaxation on the neighboring cell, when the terminal with this type has the positioning requirement and the like, the relaxation of the measurement of the neighboring cell may result in the inability to obtain the measurement result of the neighboring cell, and thus the positioning requirement cannot be guaranteed. Not performing the measurement relaxation on the terminal device that belongs to the reduced capacity terminal type may avoid the problem that the positioning requirement of the terminal device cannot be met due to the measurement relaxation.

In an embodiment, the terminal device performs the measurement relaxation based on a measurement relaxation criterion.

In some embodiments, the alternative implementation of step 310 may be: the terminal device, in the non-connected state, does not execute the measurement relaxation performed based on a first criterion.

the first criterion is a criterion agreed upon in a communication protocol and performed by the terminal device for the measurement relaxation.

In an embodiment, the first criterion includes at least one of the following: a time-domain measurement relaxation criterion; a frequency-domain measurement relaxation criterion; or a space-domain measurement relaxation criterion.

For example, the time-domain measurement relaxation criterion includes increasing a measurement interval or stopping measurement for a time period.

For example, the frequency-domain measurement relaxation criterion includes reducing measurement for some frequency points and cells.

For example, the space-domain measurement relaxation criterion includes reducing measurements for some beams.

In the embodiment of the present disclosure, the first criterion may be either a part of measurement relaxation criteria or all measurement relaxation criteria.

That is, the terminal device may only not perform a part of the measurement relaxation criteria in the non-connected state, while the other part of the measurement relaxation criteria may continue to be performed; and the terminal device may also not perform all measurement relaxation criteria.

For example, the terminal device is a terminal device with the positioning requirement, where the positioning requirement is not high, and thus the first measurement relaxation criterion only includes: a time-domain measurement relaxation criterion of stopping the measurement for a time period.

For example, the terminal device is a terminal device with the positioning requirement, where the positioning requirement is high, and thus the first measurement relaxation criterion includes all measurement relaxation criteria.

To sum up, in the method provided in the present embodiment, the terminal device may choose not to perform a part of the measurement relaxation criteria, or choose not to perform all the measurement relaxation criteria, which is beneficial for the terminal device to perform the measurement relaxation based on the measurement relaxation criterion that support execution in some scenarios while ensuring specific requirements, achieving the effect of saving power consumption.

In an embodiment, the terminal device is indicated not to perform the measurement relaxation in the non-connected state through an explicit indication on a network side and/or a communication protocol agreement.

In some embodiments, the terminal device is indicated by the network side, with reference to FIG. 4. This embodiment may correspond to a scenario where the positioning requirement is initiated by the network side.

FIG. 4 shows a flowchart of a method for measurement relaxation provided in an embodiment of the present disclosure, which may be applied to a communication system as shown in FIG. 1. The method may include steps 410 to 430:

In step 410, the network device sends an indication message to the terminal device.

The terminal device is one of the following: a terminal device with a positioning requirement; a terminal device using a network slice service; or a terminal device with a reduced capacity terminal type. Please refer to the above embodiments for details, which is not repeated herein.

In an embodiment, the network device is a base station; and the alternative implementation of step 410 is: the base station receives a positioning notification message sent by a positioning server, the positioning notification message is used to notify that the positioning server has a requirement for positioning the terminal device; and the base station sends the indication messages to the terminal device based on the positioning notification message.

That is, the positioning server sends the positioning notification message to the base station, notifying that there is a positioning requirement, and based on the positioning notification message, the base station indicates the terminal device in the indication message not to perform the measurement relaxation in the non-connected state. Where the positioning notification message may be transferred from an anchor base station to a non-anchor base station.

The indication message is carried in a system message or a dedicated signaling. The above dedicated signaling is a signaling used for unicast communication between the network device and the terminal device.

For example, the dedicated signaling is a Radio Resource Control RRC connection release message, and the RRC connection release message is used to indicate the terminal device to enter an idle state or an inactive state.

In an embodiment, the network device is a positioning server, and the alternative implementation of step 410 is: a positioning server sends an indication message to the terminal device.

That is, the positioning server sends the indication message to the terminal device, indicating the terminal device not to perform the measurement relaxation in the non-connected state.

For example, the positioning server sends the indication message to the base station, and the base station forwards the indication message to the terminal device. The base station only performs transparent transmission processing on the indication message and does not recognize content of the indication message.

In step 420, the terminal device receives an indication message.

As described in step 410 above, the terminal device may receive the indication message from the base station or from the positioning server.

In step 430, the terminal device does not perform the measurement relaxation in the non-connected state based on the indication message.

In an embodiment, the terminal device does not perform the measurement relaxation in the non-connected state based on the indication in the indication message provided by the network device.

In another embodiment, the behavior of the terminal device is agreed upon by a communication protocol. That is, based on the agreed rule in the communication protocol, the terminal device does not perform the measurement relaxation in the non-connected state.

The above two embodiments may be combined and implemented. That is, the terminal device does not perform the measurement relaxation in the non-connected state based on the indication message and the agreed rule in the communication protocol.

In an embodiment, the not performing the measurement relaxation in the non-connected state may be attached with a constraint. That is, in the non-connected state, the terminal device does not perform the measurement relaxation in a range in which the constraint is in effect.

The constraint includes at least one of the following: a constraint carried in the indication message; or a constraint agreed in the communication protocol. That is, the constraint may be attached to the indication message sent by the network device to the terminal device, and the agreed rule in the communication protocol may also be attached with the constraint.

In an embodiment, a type of the constraint includes: the terminal device not performing the measurement relaxation within a target time period, or the terminal device not performing the measurement relaxation within a target area. In a case that the constraint is a constraint carried in the indication message, the target time period or the target area may be indicated by the network device through the system message or the dedicated signaling; in a case that the constraint is a constraint agreed upon in the communication protocol, the target time period or the target area may be agreed upon in the communication protocol.

A target area range may be a Tracking Area (TA) or a Radio Access Network Notification Area (Ran Notification Area RNA).

For example, the positioning server indicates the terminal device not to perform the measurement relaxation within a target time range T, as there is currently a requirement to position the terminal device. For example, the base station indicates that the terminal device does not perform the measurement relaxation in some cells of the base station. For example, based on the agreed rule in the communication protocol, the terminal device does not perform the measurement relaxation within the target time range T. For example, based on the agreed rule in the communication protocol, the terminal device does not perform the measurement relaxation in some cells.

To sum up, in the method provided in the present embodiment, the terminal device may not perform the measurement relaxation in the non-connected state through the explicit indication on the network side or the communication protocol agreement, so as to avoid the problem that the requirement cannot be guaranteed caused by the performance of the measurement relaxation in the current scenario.

In the method provided in the present embodiment, when the network side indicates the terminal device not to perform the measurement relaxation in the non-connected state, the positioning server may indicate the terminal device or the base station may indicate the terminal device, so as to improve the flexibility of the indication to the terminal device.

In the method provided in the present embodiment, the not performing the measurement relaxation in the non-connected state may be attached with the constraint, and the terminal device may not perform the measurement relaxation in the non-connected state based on an additional time constraint or an additional region constraint, so as to avoid the problem that the specific requirement cannot be guaranteed caused by the measurement relaxation performed within a certain time range or a certain area.

In an embodiment, a protocol layer of the terminal device includes a non-access stratum and an access stratum, and the non-access stratum provides a high-layer indication to the access stratum, informing that the measurement relaxation is not performed in the non-connected state.

In an embodiment, the alternative implementation of step 310 is: a non-access stratum transmits a high-layer indication to an access stratum; the access stratum, based on the high-layer indication, does not perform the measurement relaxation in the non-connected state.

This embodiment may correspond to a scenario where the positioning requirement is initiated by the terminal device, or a scenario where the related information of the network slices used by the terminal device changes.

In an embodiment, the high-layer indication includes a first high-layer indication, the first high-layer indication is used to indicate that the measurement relaxation is not performed in the non-connected state. The first high-layer indication may be the explicit indication, that is, the non-access stratum directly indicates that the access stratum does not perform the measurement relaxation in the non-connected state.

In an embodiment, the high-layer indication includes a second high-layer indication, and the second high-layer indication is used to indicate triggering reason information, and the triggering reason information is used to notify a reason for triggering the terminal device not to perform the measurement relaxation in the non-connected state. The second high-layer indication may be an implicit indication, that is, the non-access stratum indicates the triggering reason information to the access stratum, and the access stratum decides not to perform the measurement relaxation in the non-connected state based on the triggering reason information.

The triggering reason information may be implemented in one of the following:

The triggering reason information includes: a positioning requirement notification, the positioning requirement notification is used to notify that the terminal device has a positioning requirement.

That is, the non-access stratum informs the access stratum that the terminal device has the positioning requirement, and thus the access stratum decides not to perform the measurement relaxation in the non-connected state.

The triggering reason information includes: a network slice information change notification, and the network slice information change notification used to notify that there is a change in related information of a network slice of the terminal device.

That is, the non-access stratum informs the access stratum that there is a change in the related information of the network slice of the terminal device, and thus the access stratum decides not to perform the measurement relaxation in the non-connected state.

For example, the related information of the network slice of the terminal device includes at least one of the following information: S-NSSAI, SST, slice group, slice identification, slice group identification, operator-defined access category corresponding to a slice, and frequency information related to the slice.

The triggering reason information includes: network slice information, and the network slice information is used to notify current related information of a network slice of the terminal device.

For example, the non-access stratum informs the access stratum the related information of the network slice of the terminal device, and in the case that the access stratum determines that the network slice information of the terminal device has changed based on the network slice information, the access stratum decides not to perform the measurement relaxation in the non-connected state.

For example, the non-access stratum informs the access stratum the related information of the network slice of the terminal device, and in the case that the access stratum determines a frequency priority has changed based on the network slice information, the access stratum decides not to perform the measurement relaxation in the non-connected state.

For example, the related information of the network slice of the terminal device includes at least one of the following information: S-NSSAI, SST, slice group, slice identification, slice group identification, operator-defined access category corresponding to a slice, and frequency information related to the slice.

To sum up, in the method provided in the present embodiment, the high-layer indication is transmitted to the access stratum through the non-access stratum, and the terminal device may not perform the measurement relaxation in the non-connected state based on the high-layer indication, so as to avoid the problem that the specific requirement cannot be guaranteed caused by the performance of the measurement relaxation in the current scenario.

In an embodiment, a protocol layer of the terminal device includes an access stratum and a non-access stratum. When the measurement relaxation is not performed in the non-connected state and takes effect, there are several possible implementations as follows, where the access stratum does not perform upcoming measurement relaxation in the non-connected state.

For example, the terminal device is a terminal device with a positioning requirement, and the access stratum does not enter the upcoming measurement relaxation in the non-connected state.

The access stratum stops current measurement relaxation in the non-connected state.

For example, the terminal device is a terminal device with a positioning requirement, and the access stratum stops the current measurement relaxation in the non-connected state, and returns the manner of the original conventional RRM measurement for the measurement.

The access stratum stops current measurement relaxation in the non-connected state and enters a next measurement relaxation evaluation cycle based on a parameter provided by the non-access stratum.

For example, the terminal device is a terminal device using a network slice service, the access stratum stops the current measurement relaxation in the non-connected state and updates it according to the parameter provided by the non-access stratum, so as to perform a next round of measurement relaxation evaluation.

In a scenario where the terminal device is the terminal device using the network slice service, the access stratum may also continue the current measurement relaxation in the non-connected state. After the end of the current measurement relaxation evaluation cycle, the next measurement relaxation evaluation cycle may be entered based on the parameter provided by the non-access stratum.

The above embodiments of the present disclosure may be implemented individually or in combination, which is not limited in the present disclosure.

In the above embodiments, the steps performed by the terminal device may be independently implemented as the method for measurement relaxation on a side of the terminal device, and the steps performed by the network device may be independently implemented as the method for measurement relaxation on a side of the network device.

The embodiments of the apparatus according to the present disclosure are illustrated as follows, the apparatus may be used to perform the method embodiments of the present disclosure. For details that are not disclosed in the apparatus embodiments of the present disclosure, please refer to the method embodiments of the present disclosure.

FIG. 5 shows a structural block diagram of an apparatus for measurement relaxation provided in an embodiment of the present disclosure, which may be implemented as a terminal device or as a part of the terminal device. The apparatus includes: a processing module 510;

the processing module 510 is configured to not perform measurement relaxation in a non-connected state.

In an embodiment, the apparatus is one of the following:

an apparatus with a positioning requirement; an apparatus using a network slice service; or an apparatus belonging to a reduced capacity terminal type.

In an embodiment, the processing module 510 is further configured to, in the non-connected state, not execute the measurement relaxation performed based on a first criterion.

In an embodiment, the first criterion includes at least one of the following:

a time-domain measurement relaxation criterion; a frequency-domain measurement relaxation criterion; or a space-domain measurement relaxation criterion.

In an embodiment, the apparatus further includes:

a receiving module 520 configured to receive an indication message sent by a network device;

the processing module 510 is further configured to not perform the measurement relaxation in the non-connected state based on the indication message; or The processing module 510 is further configured to not perform the measurement relaxation in the non-connected state based on an agreed rule in a communication protocol.

In an embodiment, the processing module 510 is further configured to not perform the measurement relaxation in a range in which a constraint is in effect in the non-connected state.

In an embodiment, the constraint includes at least one of the following: a constraint carried in the indication message; or a constraint agreed upon in the communication protocol.

In an embodiment, a type of the constraint include: the processing module 510 not performing the measurement relaxation within a target time period, or the processing module 510 not performing the measurement relaxation within a target area.

In an embodiment, the indication message is carried in a system message or a dedicated signaling.

In an embodiment, the dedicated signaling is a Radio Resource Control RRC connection release message, and the RRC connection release message is used to indicate the apparatus to enter an idle state or an inactive state.

In an embodiment, the processing module 510 is further configured that a non-access stratum transmits a high-layer indication to an access stratum; and the access stratum does not perform the measurement relaxation in the non-connected state based on the high-layer indication.

In an embodiment, the high-layer indication is used to indicate not performing the measurement relaxation in the non-connected state, or the high-layer indication is used to indicate triggering reason information, where the triggering reason information is used to notify a reason for triggering the apparatus not to perform the measurement relaxation in the non-connected state.

In an embodiment, the triggering reason information is one of the following:

a positioning requirement notification, used to notify that the apparatus has a positioning requirement;

a network slice information change notification, used to notify that there is a change in related information of a network slice of the apparatus; or network slice information, used to notify current related information of a network slice of the apparatus.

In an embodiment, the processing module 510 is further configured that an access stratum does not perform upcoming measurement relaxation in the non-connected state; or the processing module 510 is further configured that an access stratum stops current measurement relaxation in the non-connected state; or the processing module 510 is further configured that an access stratum stops current measurement relaxation in the non-connected state and enters a next measurement relaxation evaluation cycle based on a parameter provided by a non-access stratum.

FIG. 6 shows a structural block diagram of an apparatus for measurement relaxation provided in an embodiment of the present disclosure, which may be implemented as a network device or as a part of a network device. The apparatus includes a transceiver module 610;

the transceiver module 610 is configured to send an indication message to a terminal device, where the indication message is used to indicate that the terminal device does not perform measurement relaxation in a non-connected state.

In an embodiment, the terminal device is one of the following:

a terminal device with a positioning requirement;

a terminal device using a network slice service; or a terminal device with a reduced capacity terminal type.

In an embodiment, the indication message is carried with a constraint, and the indication message is used to indicate that the terminal device does not perform the measurement relaxation in the non-connected state in a range in which the constraint is in effect.

In an embodiment, a type of the constraint includes: the terminal device not performing the measurement relaxation within a target time period, or the terminal device not performing the measurement relaxation within a target area.

In an embodiment, the apparatus is a base station;

the transceiver module 610 is further configured to: receive a positioning notification message sent by a positioning server, where the positioning notification message is used to notify that the positioning server has a requirement for positioning the terminal device; and send, based on the positioning notification message, the indication message to the terminal device.

In an embodiment, the indication message is carried in a system message or a dedicated signaling.

In an embodiment, the dedicated signaling is a Radio Resource Control RRC connection release message, and the RRC connection release message is used to indicate the terminal device to enter an idle state or an inactive state.

In an embodiment, the apparatus is a positioning server.

Figure 7:
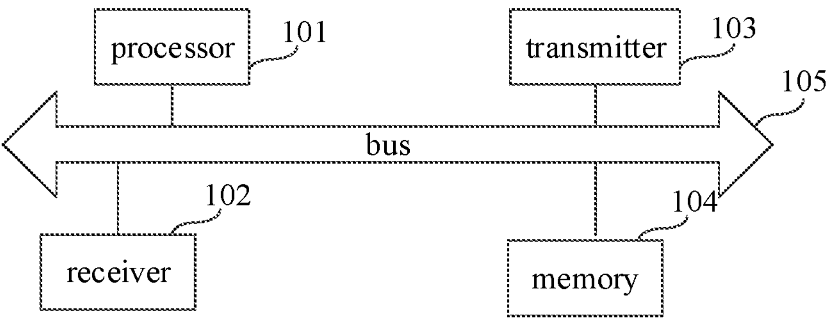
FIG. 7 is a block diagram of a communication device provided in an embodiment of the present disclosure.

FIG. 7 is a block diagram of a communication device (a terminal device or a network device) according to an embodiment of the present disclosure. The communication device includes: a processor 101, a receiver 102, a transmitter 103, a memory 104, and a bus 105.

The processor 101 includes one or more processing cores. The processor 101 performs various functional applications and processes information by running software programs and modules.

The receiver 102 and the transmitter 103 may be implemented as a communication component, which may be a communication chip.

The memory 104 is connected to the processor 101 via the bus 105.

The memory 104 is configured to store at least one instruction. The processor 101 is configured to execute the at least one instruction to implement the operations in the method embodiments described above.

In addition, the memory 104 may be implemented by any type of volatile or non-volatile storage device or a combination thereof. The volatile or non-volatile storage device includes, but is not limited to: a disk or an optical disk, an electrically erasable programmable read only memory (EEPROM), an erasable programmable read only memory (EPROM), a static random access memory (SRAM), a read-only memory (ROM), a magnetic memory, a flash memory, and a programmable read-only memory (PROM).

In an embodiment, a chip is provided, and includes programmable logic circuits and/or program instructions, when the chip operates, the method for measurement relaxation according to the above aspects is implemented In an embodiment, a computer readable storage medium is provided. The computer readable storage medium stores at least one instruction, at least one program, a code set or an instruction set. The at least one instruction, the at least one program, the code set or the instruction set are loaded and executed by the processor to allow the communication device to implement the method for measurement relaxation as provided in each embodiment of the above method embodiments.

In an embodiment, a computer program product or a computer program is provided. The computer program product or the computer program includes computer instructions, and the computer instructions are stored in the computer readable storage medium. A processor of the computer device reads the computer instructions from the computer readable storage medium, and the processor executes the computer instructions such that the computer device can perform the method for measurement relaxation provided in the above aspects of the present disclosure.

According to an aspect of the present disclosure, a method for measurement relaxation is provided, the method is performed by a terminal device and includes:

not performing measurement relaxation in a non-connected state.

According to an aspect of the present disclosure, a method for measurement relaxation is provided, the method is performed by a network device and includes:

sending an indication message to a terminal device, where the indication message is used to indicate that the terminal device does not perform measurement relaxation in a non-connected state.

According to an aspect of the present disclosure, an apparatus for measurement relaxation is provided and includes:

a processing module, configured to not perform measurement relaxation in a non-connected state.

According to an aspect of the present disclosure, an apparatus for measurement relaxation is provided and includes:

a transceiver module, configured to send an indication message to a terminal device, where the indication message is used to indicate that the terminal device does not perform measurement relaxation in a non-connected state.

According to an aspect of the present disclosure, a communication device is provided and includes: a processor; a transceiver connected to the processor; and a memory for storing executable instructions of the processor; where the processor is configured to load and execute the executable instructions to implement the method for measurement relaxation performed by the terminal device according to the above aspect.

According to an aspect of the present disclosure, a communication device is provided and includes: a processor; a transceiver connected to the processor; and a memory for storing executable instructions of the processor; where the processor is configured to load and execute the executable instructions to implement the method for measurement relaxation performed by the network device according to the above aspect.

According to an aspect of the present disclosure, a chip is provided and includes programmable logic circuits and/or program instructions, when the chip operates, the method for measurement relaxation according to the above aspects is implemented.

According to an aspect of the present disclosure, a computer readable storage medium storing an executable instruction that is loaded and executed by a processor to implement the method for measurement relaxation according to the above aspects.

According to an aspect of the present disclosure, a computer program product or a computer program is provided. The computer program product or the computer program includes computer instructions, and the computer instructions are stored in the computer readable storage medium. A processor of the computer device reads the computer instructions from the computer readable storage medium, and the processor executes the computer instructions such that the computer device can perform the method for measurement relaxation provided in the above aspects of the present disclosure.

Through the technical solutions provided by the embodiments of the present disclosure, the terminal device may not perform the measurement relaxation in the non-connected state, so as to avoid the problem that the specific requirement cannot be guaranteed caused by the performance of the measurement relaxation in the current scenario.

All or part of the operations in the above embodiments may be executed by hardware, or the relevant hardware may be instructed to execute the above embodiments by a program.

The program may be stored in a computer readable storage medium, which may be a ROM, a disk or a CD-ROM.

The foregoing is only optional embodiments of the present disclosure and are not intended to limit the present disclosure. Any modifications, equivalent substitutions, improvements made within the spirit and principles of the present disclosure shall be included within the scope of protection of the present disclosure.

What is claimed is:

1. A method for measurement relaxation, comprising:

refraining from performing, by a terminal device, measurement relaxation in a non-connected state;

wherein refraining from performing the measurement relaxation in the non-connected state comprises:

transmitting, by a non-access stratum, a high-layer indication to an access stratum; and refraining from performing, by the access stratum based on the high-layer indication, the measurement relaxation in the non-connected state.

2. The method according to claim 1, wherein the terminal device is one of the following:

a terminal device with a positioning requirement;

a terminal device using a network slice service; or a terminal device with a reduced capacity terminal type.

3. The method according to claim 1, wherein refraining from performing the measurement relaxation in the non-connected state comprises:

in the non-connected state, refraining from performing the measurement relaxation which is configured to be performed based on a first criterion.

4. The method according to claim 3, wherein the first criterion comprises at least one of the following:

a time-domain measurement relaxation criterion;

a frequency-domain measurement relaxation criterion; or a space-domain measurement relaxation criterion.

5. The method according to claim 1, wherein refraining from performing the measurement relaxation in the non-connected state comprises at least one of the following:

receiving, by the terminal device, an indication message sent by a network device, and refraining from performing, based on the indication message, the measurement relaxation in the non-connected state; or refraining from performing, based on an agreed rule in a communication protocol, the measurement relaxation in the non-connected state.

6. The method according to claim 1, wherein refraining from performing the measurement relaxation in the non-connected state comprises:

in the non-connected state, refraining from performing the measurement relaxation in case that a constraint is in effect.

7. The method according to claim 6, wherein the constraint comprises at least one of the following:

a constraint carried in an indication message, wherein the indication message is sent by a network device and received by the terminal device; or a constraint agreed upon in a communication protocol, wherein the communication protocol has an agreed rule.

8. The method according to claim 6, wherein a type of the constraint comprises: the terminal device refraining from performing the measurement relaxation within a target time period, or the terminal device refraining from performing the measurement relaxation within a target area.

9. The method according to claim 1, wherein refraining from performing the measurement relaxation in the non-connected state comprises:

receiving an indication message sent by a network device, and refraining from performing, based on the indication message, the measurement relaxation in the non-connected state;

wherein the indication message is carried in a system message or a dedicated signaling.

10. The method according to claim 9, wherein the dedicated signaling is a Radio Resource Control (RRC) connection release message, and the RRC connection release message is configured to indicate the terminal device to enter an idle state or an inactive state.

11. The method according to claim 1, wherein the high-layer indication is configured to indicate refraining from performing the measurement relaxation in the non-connected state, or the high-layer indication is configured to indicate triggering reason information, and the triggering reason information is configured to notify a reason for triggering the terminal device to refrain from performing the measurement relaxation in the non-connected state.

12. The method according to claim 1, wherein the high-layer indication is configured to indicate triggering reason information, and the triggering reason information is configured to notify a reason for triggering the terminal device to refrain from performing the measurement relaxation in the non-connected state; and the triggering reason information comprises one of the following:

a positioning requirement notification, configured to notify that the terminal device has a positioning requirement;

a network slice information change notification, configured to notify that there is a change in related information of a network slice of the terminal device; or network slice information, configured to notify current related information of a network slice of the terminal device.

13. The method according to claim 1, wherein refraining from performing the measurement relaxation in the non-connected state comprises one of the following:

refraining from performing, by an access stratum, upcoming measurement relaxation in the non-connected state;

stopping, by an access stratum, current measurement relaxation in the non-connected state; or stopping, by an access stratum, current measurement relaxation in the non-connected state and entering, by the access stratum, a next measurement relaxation evaluation cycle based on a parameter provided by a non-access stratum.

14. A computer readable storage medium storing an executable instruction that is loaded and executed by a processor to implement the method for measurement relaxation according to claim 1.

15. A method for measurement relaxation, comprising:

sending, by a network device, an indication message to a terminal device, wherein the indication message is configured to indicate that the terminal device refrains from performing measurement relaxation in a non-connected state;

wherein the indication message is a high-layer indication transmitted from a non-access stratum to an access stratum, and the access stratum refrains from performing the measurement relaxation in the non-connected state based on the high-layer indication.

16. The method according to claim 15, wherein the indication message carries a constraint, and the indication message is configured to indicate that the terminal device refrains from performing the measurement relaxation in the non-connected state in case that the constraint is in effect.

17. The method according to claim 15, wherein the network device is a base station; and sending the indication message to the terminal device comprises:

receiving a positioning notification message sent by a positioning server, wherein the positioning notification message is configured to notify that the positioning server has a requirement for positioning the terminal device; and sending, based on the positioning notification message, the indication message to the terminal device.

18. A communication device, comprising:

a processor;

a transceiver connected to the processor; and a memory for storing executable instructions of the processor;

wherein the processor is configured to load and execute the executable instructions to implement the method for measurement relaxation according to claim 15.

19. A communication device, comprising:

a processor;

a transceiver connected to the processor; and a memory for storing executable instructions of the processor;

wherein the processor is configured to load and execute the executable instructions to implement the following operation:

refraining from performing measurement relaxation in a non-connected state;

wherein the processor is configured to implement the following operation:

transmitting, by a non-access stratum, a high-layer indication to an access stratum; and refraining from performing, by the access stratum based on the high-layer indication, the measurement relaxation in the non-connected state.

* * * * *